United States Patent
Hidaka

(10) Patent No.: US 11,230,204 B2
(45) Date of Patent: Jan. 25, 2022

(54) POWER MANAGEMENT APPARATUS, POWER MANAGEMENT SYSTEM, AND POWER MANAGEMENT METHOD

(71) Applicant: KYOCERA Corporation, Kyoto (JP)

(72) Inventor: Hiroyuki Hidaka, Tokyo (JP)

(73) Assignee: KYOCERA CORPORATION, Kyoto (JP)

( * ) Notice: Subject to any disclaimer, the term of this patent is extended or adjusted under 35 U.S.C. 154(b) by 178 days.

(21) Appl. No.: 16/089,355

(22) PCT Filed: Mar. 29, 2017

(86) PCT No.: PCT/JP2017/013015
§ 371 (c)(1),
(2) Date: Sep. 27, 2018

(87) PCT Pub. No.: WO2017/170741
PCT Pub. Date: Oct. 5, 2017

(65) Prior Publication Data
US 2019/0111805 A1     Apr. 18, 2019

(30) Foreign Application Priority Data
Mar. 29, 2016    (JP) .............................. JP2016-066828

(51) Int. Cl.
| | |
|---|---|
| B60L 58/10 | (2019.01) |
| H02J 3/32 | (2006.01) |
| H02J 3/38 | (2006.01) |
| H02J 7/00 | (2006.01) |
| H02J 3/46 | (2006.01) |

(Continued)

(52) U.S. Cl.
CPC ............... *B60L 58/10* (2019.02); *B60L 53/35* (2019.02); *B60L 58/14* (2019.02); *H02J 3/32* (2013.01); *H02J 3/38* (2013.01); *H02J 3/46* (2013.01); *H02J 7/00* (2013.01); *H02J 7/0068* (2013.01)

(58) Field of Classification Search
CPC .......... B60L 58/10; B60L 53/35; B60L 58/14; H02J 3/32; H02J 3/38; H02J 3/46; H02J 7/00; H02J 7/0068
See application file for complete search history.

(56) References Cited

U.S. PATENT DOCUMENTS

| | | | |
|---|---|---|---|
| 7,042,176 B2 | 5/2006 | Wobben | |
| 8,359,132 B2 * | 1/2013 | Laberteaux | ............. B60L 53/11 701/22 |

(Continued)

FOREIGN PATENT DOCUMENTS

| | | |
|---|---|---|
| EP | 2056420 A1 | 5/2009 |
| EP | 2784744 A1 | 10/2014 |

(Continued)

*Primary Examiner* — Jared Fureman
*Assistant Examiner* — Duc M Pham
(74) *Attorney, Agent, or Firm* — Hauptman Ham, LLP

(57) ABSTRACT

A power management apparatus is provided with a power supply control unit for controlling the supply of power from a system to a facility load. In a state in which a storage cell mounted in a vehicle is electrically connected to the system, the power supply control unit acquires information relating to the storage cell status, and on the basis of the information and vehicle operation input, supplies power stored in the storage cell to at least one of the system and the load.

15 Claims, 9 Drawing Sheets

(51) Int. Cl.
    *B60L 53/35*   (2019.01)
    *B60L 58/14*   (2019.01)

(56) References Cited

U.S. PATENT DOCUMENTS

| | | | | |
|---|---|---|---|---|
| 9,387,772 | B2* | 7/2016 | Usuki | B60L 53/30 |
| 9,744,963 | B2* | 8/2017 | Kinomura | B60L 15/007 |
| 2005/0127855 | A1 | 6/2005 | Wobben | |
| 2009/0171554 | A1* | 7/2009 | Yaguchi | B60L 15/2045 |
| | | | | 701/112 |
| 2010/0000809 | A1* | 1/2010 | Nishi | B60L 58/16 |
| | | | | 180/65.29 |
| 2012/0179420 | A1* | 7/2012 | Gilman | G01C 21/3697 |
| | | | | 702/165 |
| 2012/0228933 | A1* | 9/2012 | Shiokawa | H02J 7/35 |
| | | | | 307/19 |
| 2014/0312841 | A1* | 10/2014 | Baba | B60L 58/12 |
| | | | | 320/109 |
| 2015/0191164 | A1* | 7/2015 | Kinomura | B60W 20/20 |
| | | | | 701/22 |
| 2015/0255984 | A1 | 9/2015 | Higashi | |
| 2015/0329003 | A1* | 11/2015 | Li | B60L 53/66 |
| | | | | 320/134 |
| 2016/0221456 | A1* | 8/2016 | Rhodes | B60L 50/66 |
| 2017/0102677 | A1* | 4/2017 | Hidaka | H02J 7/0068 |
| 2017/0117710 | A1* | 4/2017 | Viehweider | H02J 7/345 |

FOREIGN PATENT DOCUMENTS

| | | |
|---|---|---|
| JP | H10-271694 A | 10/1998 |
| JP | 2005-515747 A | 5/2005 |
| JP | 2012-23797 A | 2/2012 |
| WO | 2009/014543 A1 | 1/2009 |
| WO | 2013/031657 A1 | 3/2013 |

* cited by examiner

FIG. 3

| time slot | 6/1 Sunday | | 6/2 Monday | | 6/3 Tuesday | | 6/4 Wednesday | |
|---|---|---|---|---|---|---|---|---|
| | for traveling | for grid use | for traveling | for grid use | for traveling | for grid use | for traveling | for grid use |
| 0:00 – 0:30 | 24.0 | 0.0 | 5.0 | 19.0 | 5.0 | 19.0 | 5.0 | 19.0 |
| 0:03 – 1:00 | 24.0 | 0.0 | 5.0 | 19.0 | 5.0 | 19.0 | 5.0 | 19.0 |
| 1:00 – 1:30 | 24.0 | 0.0 | 5.0 | 19.0 | 5.0 | 19.0 | 5.0 | 19.0 |
| 7:00 – 7:30 | 24.0 | 0.0 | 5.0 | 19.0 | 5.0 | 19.0 | 5.0 | 19.0 |
| 7:30 – 8:00 | 24.0 | 0.0 | 3.4 | 19.0 | 3.3 | 19.0 | 3.3 | 19.0 |
| 8:00 – 8:30 | 22.9 | 0.0 | 3.4 | 19.0 | 3.3 | 19.0 | 3.3 | 19.0 |
| 13:00 – 13:30 | 12.3 | 0.0 | 3.4 | 19.0 | 3.3 | 19.0 | 3.3 | 19.0 |
| 13:30 – 14:00 | 11.0 | 0.0 | 3.4 | 19.0 | 3.3 | 19.0 | 3.3 | 19.0 |
| 14:00 – 14:30 | 8.6 | 0.0 | 3.4 | 19.0 | 3.3 | 19.0 | 3.3 | 19.0 |
| 14:30 – 15:00 | 6.7 | 0.0 | 3.4 | 19.0 | 3.3 | 19.0 | 3.3 | 19.0 |
| 15:00 – 15:30 | 6.2 | 0.0 | 3.4 | 19.0 | 3.3 | 19.0 | 3.3 | 19.0 |
| 23:00 – 23:30 | 4.5 | 0.0 | 1.8 | 19.0 | 1.6 | 19.0 | 1.6 | 19.0 |
| 23:30 – 0:00 | 4.5 | 0.0 | 1.8 | 19.0 | 1.6 | 19.0 | 1.6 | 19.0 |
| remaining capacity | 4.5 | 0.0 | 1.8 | 19.0 | 1.6 | 19.0 | 1.6 | 19.0 | battery capacity (kWh)

POWER MANAGEMENT APPARATUS, POWER MANAGEMENT SYSTEM, AND POWER MANAGEMENT METHOD

INCORPORATION BY REFERENCE

The present application is a national phase of International Application Number PCT/JP2017/013015, filed Mar. 29, 2017, which claims priority to Japanese Patent Application No. 2016-066828, filed Mar. 29, 2016, the entire disclosure of which application is hereby incorporated herein by reference.

TECHNICAL FIELD

The present disclosure relates to a power management apparatus, to a power management system, and to a power management method.

BACKGROUND

In the prior art, a technique has been disclosed for supplying energy accumulated in an electricity storage device mounted to a vehicle to a power grid (hereinafter referred to as a "grid"). For example, a technique is known that allows a control unit of an automobile to supply flow of current to a grid from a power accumulation device that supplies drive energy to an electric motor.

SUMMARY

A power management apparatus according to an embodiment is a power management apparatus comprising a control unit controlling the supply of power from a grid to a load of a facility, wherein, in a state in which a storage battery mounted to a vehicle is electrically connected to the grid, the control unit acquires information related to the state of the storage battery, and supplies electrical power stored in the storage battery to at least one of the grid and the load, on the basis of the information and an operation input of the vehicle.

The present disclosure can also be implemented as a system and as a method that are substantially equivalent to the power management apparatus described above, and it is to be understood that these are also included within the scope of the present disclosure.

For example, a power management system according to an embodiment comprises a storage battery that is mounted to a vehicle and that can be electrically connected to a grid, and a control unit that controls supply of power from the grid to a facility load. In a state in which the storage battery is electrically connected to the grid, the control unit acquires information related to the state of the storage battery, and supplies electrical power stored in the storage battery to at least one of the grid and the load, on the basis of the information and operational input of the vehicle.

A power management method according to an embodiment is a power management method by a power management apparatus that comprises a control unit that controls the supply of power from a grid to a facility load. In the power management method, there is included a step of, in a state in which a storage battery mounted to a vehicle is electrically connected to the grid, the control unit acquiring information related to the state of the storage battery. Moreover, in the power management method, there is included a step of the control unit supplying electrical power stored in the storage battery to at least one of the grid and the load, on the basis of the information related to the state of the storage battery that has been acquired, and operational input of the vehicle.

BRIEF DESCRIPTION OF THE DRAWINGS

In the accompanying drawings:

FIG. 3 is a table illustrating results of prediction by the power supply control unit of FIG. 1 of the power amount that can be supplied to the grid by a storage battery;

DETAILED DESCRIPTION

In cases where an owner of a vehicle (i.e. the user) has decided not to perform driving during the day, the power supply of a grid can be further stabilized if power accumulated in an electricity storage device of the vehicle can be supplied to the grid as necessary. According to the power management apparatus, the power management system, and the power management method of the present disclosure, the power supply in the grid can be further stabilized.

In the following, one embodiment of the present disclosure will be explained in detail with reference to the drawings.

Figure 1:
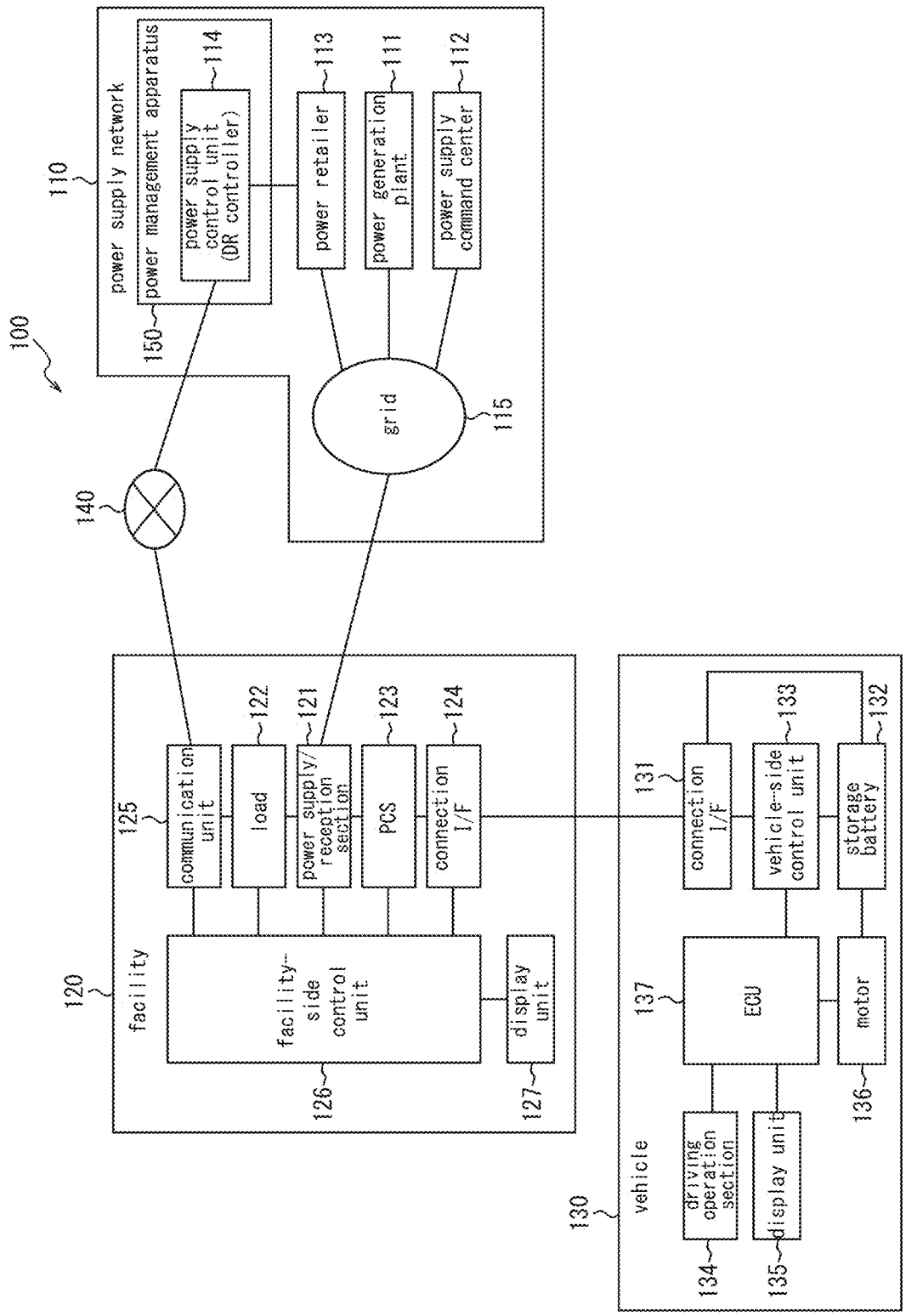
FIG. 1 is a functional block diagram illustrating the general structure of a power management system according to an embodiment.

As illustrated in FIG. 1, a power management system 100 includes a power supply network 110, a customer facility 120 (hereinafter referred to as the "facility 120"), and a vehicle 130. In FIG. 1, for the sake of explanation, one each of the facility 120 and the vehicle 130 are illustrated, but the power management system 100 includes a plurality of facilities 120 and a plurality of vehicles 130. In the present embodiment, the facility 120 is assumed to be a residence (i.e. a house) of a customer, and will hereinafter be described on that basis. In the present embodiment, it is assumed that the vehicle 130 is an electric automobile including a storage battery 132 that is capable of charging and discharging power.

In the power management system according to the present embodiment, the power supply network 110 supplies power to the facility 120. In this power management system 100, when the vehicle 130 is connected to the facility 120, for example by a cable or the like, power that has been charged into the storage battery 132 can be supplied to the power supply network 110 via wiring within the facility 120. The power supply network 110 is capable of supplying the power supplied from the storage battery 132 via the facility 120 to other facilities 120. With this power management system 100, when the customer (i.e. the user of the vehicle 130) signals his intention not to drive the vehicle 130 for a predetermined time interval by performing predetermined operational input from the facility 120 or from the vehicle 130, then power charged in the storage battery 132 is supplied to the power supply network 110. In the following, each of the structural elements comprised in the power management system 100, and also a power management method for the power management system 100, will be described in detail.

The power supply network 110 supplies power to the facility 120. The power supply network 110 comprises a power generation plant 111, a power supply command center 112, a power retailer 113, a power management apparatus 150, and a grid 115. The power management apparatus 150 includes a power supply control unit (a demand response (DR: demand response) controller) 114 (hereinafter referred to as the "control unit 114").

The power generation plant 111 generates power to be supplied to the facility 120 via the grid 115. The power generation plant 111 may, for example, perform power generation by hydraulic power, thermal power, atomic power, solar power, wind power, geothermal power or the like.

The power supply command center 112 manages the supply/demand balance of power for each of the facilities 120. In concrete terms, the power supply command center 112 supplies power to each of the facilities 120 according to the power demand by that facility 120.

The power retailer 113 concludes contracts with each customer and sells power to each facility 120. In concrete terms, the power retailer 113 provides the service of supplying power to the facilities 120 according to the details of the contract with each customer. The power retailer 113 may be the same power company that owns the power generation plant 111 or may be a company that is independent from the power company.

The control unit 114 controls the supply of power from the grid 115 to each of the facilities 120. The control unit 114 predicts the power supply/demand balance. For example, on the basis of the power that the power supply network 110 is capable of supplying to the facilities 120 (i.e. the power supply amount) and the amount of power that it is predicted that the facilities 120 will use (i.e. the required power amount), the control unit 114 may determine whether it is possible to supply the requested amount of power to the power supply network 110. In this embodiment, the power supply amount includes the amount of power that can be supplied from the storage battery 132 of the vehicle 130 to the grid 115, in a case in which the user of the vehicle 130 performs a predetermined operation input. The control unit 114 acquires information related to the state of the storage battery 132 of the vehicle 130 via the facility 120 and predicts the power supply amount. This information related to the state of the storage battery 132 of the vehicle 130 includes information related to the power stored in the storage battery 132 (i.e. the remaining amount of power therein). According to requirements, the control unit 114 is capable of supplying power to the grid 115 from the storage battery 132 which is electrically connected to the grid 115.

When it has been determined that the requested power amount exceeds the power supply amount, the control unit 114 issues a power reduction request to the customer for demanding a reduction of the power consumed at the facility 120. This power reduction request may be sent, for example, to a terminal device, or the like, possessed by the customer.

In the present embodiment, the control unit 114 predicts the power amount that can be supplied to the grid 115, and predicts a power supply/demand balance that also includes the amount of power that can be supplied from the storage battery 132 of the vehicle 130 of the customer. The details of the method for this prediction of the power supply/demand balance by the control unit 114 will be described hereinafter.

The grid 115 includes wiring equipment and so on for supplying power to the facility 120.

The facility 120 is a facility where the customer consumes electrical power. As functional units that are employed by the power management system 100, the facility 120 includes a power supply/reception unit 121, a load 122, a power conditioning system (PCS) 123, a connection interface (I/F: interface) 124, a communication unit 125, a facility-side control unit 126 (hereinafter referred to as the "control unit 126"), and a display unit 127.

The power supply/reception unit 121 acquires power supplied from the grid 115. And, when the vehicle 130 is connected to the facility 120, the power supply/reception unit 121 is capable of supplying the power of the storage battery 132 to the grid 115.

The load 122 is a powered load that consumes power, and for example may include various electrical appliances used in a home such as an air conditioner, a microwave oven, a television, and so on, and/or machines such as an air conditioner or lighting equipment used in a commercial or industrial facility or the like.

The PCS 123 performs conversion between AC power supplied from the grid 115 and DC power charged into or discharged from the storage battery 132. This power conversion can be performed by the function of a conventional inverter. When the storage battery 132 is being charged, the PCS 123 converts AC power supplied from the grid 115 into DC power, which is supplied to the vehicle 130. When power charged into the storage battery 132 is being supplied to the grid 115, the PCS 123 converts DC power supplied from the storage battery 132 into AC power, which is supplied to the grid 115.

The connection I/F 124 is an interface for connecting the vehicle 130 to the facility 120 by being connected to a connection I/F 131 which is provided to the vehicle 130. The facility 120 and the vehicle 130 are mutually connected together by, for example, a charging plug of a charging cable of the facility 120 being connected to (i.e. inserted into) an inlet of the vehicle 130.

The communication unit 125 performs transmission and reception of information of various types by performing communication with the control unit 114 via the network 140. The communication unit 125 may, for example, transmit to the control unit 114 information of various types that is required for the control unit 114 to predict the power supply/demand balance. An example of the information transmitted by the communication unit 125 to the control unit 114 will be described hereinafter. The communication unit 125, for example, may be built integrally with a smart meter that is capable of measuring the power supplied from the grid 115 to the facility 120, and the power supplied from the facility 120 to the grid 115.

The control unit 126 is a processor that performs control and management of each functional block within the facility 120. The control unit 126 may, for example, manage the operational states and the power consumption states (i.e. the power consumption amounts) of the various devices constituting the load 122.

The display unit 127 is a display device that incorporates a known display, such as a liquid crystal display, an organic EL display, or an inorganic EL display or the like. The display unit 127 displays information of various types related to the power management system 100 on the basis of information related to the output contents acquired from the control unit 126. In cases where the display unit 127, for example, incorporates a touch screen, it also functions as an input unit that receives the operation input from the customer.

The vehicle 130 is a vehicle in which the customer can ride and travel, and for example may be an electric automobile. The vehicle 130 comprises the connection I/F 131, the storage battery 132, a vehicle-side control unit 133 (hereinafter referred to as the "control unit 133"), a driving operation unit 134, a display unit 135, a motor 136, and an electronic control unit (ECU: Electronic Control Unit) 137.

The connection I/F 131 is an interface for connecting the vehicle 130 to the facility 120 by being connected to the connection I/F 124 of the facility 120. When the vehicle 130 is connected to the facility 120, information of various types related to the vehicle 130 (i.e. vehicle information) is transmitted to the facility 120 via the connection I/F 131. For example, the vehicle 130 may transmit to the facility 120 information related to the distance traveled by the vehicle 130 and information related to the state of the storage battery 132.

The storage battery 132 may consist of a storage battery such as a lithium ion battery or a nickel hydrogen battery or the like. The storage battery 132 is capable of supplying power to the motor 136 by discharging charged power. The storage battery 132 can be charged with power supplied from the grid 115 via the facility 120. The storage battery 132 can supply power to the grid 115 via the facility 120 by discharging charged power.

The control unit 133 is a processor that controls charging and discharging of the storage battery 132. Accordingly, the charging and discharging of the storage battery 132 described above is controlled by the control unit 133. The control unit 133 performs communication with the facility 120 via the connection I/F 131, and transmits and receives information of various types. For example, the control unit 133 may transmit information related to the state of the storage battery 132 to the facility 120.

The driving operation unit 134 is a driving interface via which the customer drives and operates the vehicle 130, and includes, for example, a steering wheel and a shift lever.

The display unit 135 is a display device that includes a known display, such as for example a liquid crystal display, an organic EL display, an inorganic EL display, or the like. The driving conditions of the vehicle 130 and information of various types related to the vehicle 130 are displayed upon the display unit 135. Information of various types related to the power management system is also displayed upon the display unit 135.

The display unit 135 may, for example, include a touch screen. In this case, the display unit 135 may also function as an input unit that receives the operation input from the customer. The display unit 135 may also, for example, be a head up display (HUD: Head Up Display). Such a HUD projects an image upon the front windshield of the vehicle 130, and enables the customer to view the reflection of this projected image as a virtual image.

The motor 136 provides motive power to the vehicle 130, and is driven on the basis of power supplied from the storage battery 132.

The ECU 137 controls the entire vehicle 130. In other words, the ECU 137 controls the display unit 135, the motor 136, and other controlled devices (not illustrated) with which the vehicle 130 is equipped. Examples of such other controlled devices mentioned here may be a transmission, a vehicle air conditioner, power windows, a vehicle navigation system, vehicle audio, and so on, and in fact any device that is used in connection with the vehicle 130.

Next, the processing in the power management system 100 performed by the control unit 114 for predicting the power supply/demand balance, and the control related thereto, will be explained with reference to FIG. 2.

Figure 2:
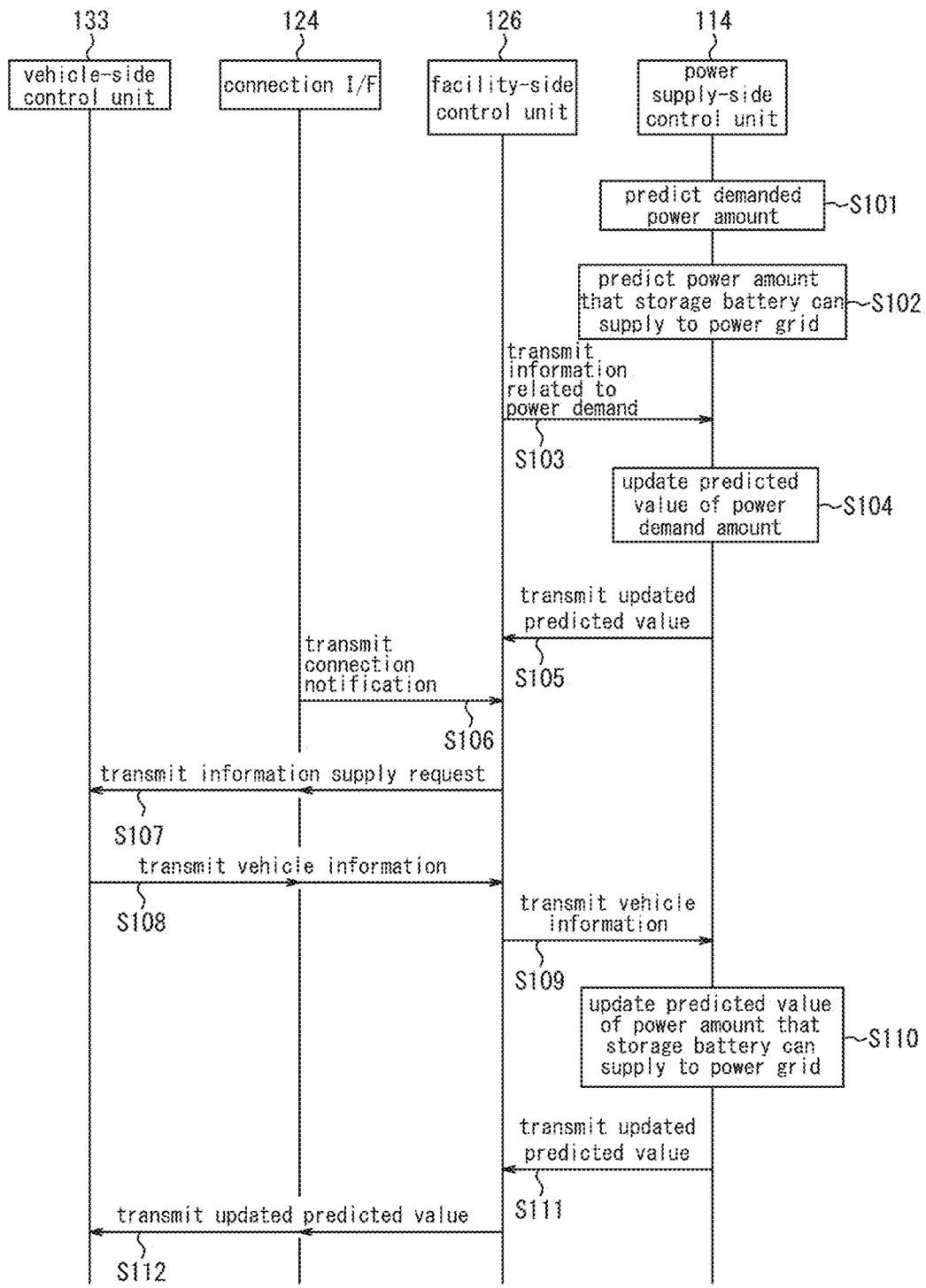
FIG. 2 is a sequence diagram illustrating an example of a power supply/demand balance prediction procedure by the power management system of FIG. 1.

At the starting time point of the sequence diagram of FIG. 2, the facility 120 and the vehicle 130 are not connected.

First, the control unit 114 predicts the power amount demanded by the facility 120 after a predetermined time period (step S101). The control unit 114 calculates a predicted value of the demanded power amount on the basis of information related to power consumed by the facility 120 in the past, which is, for example, stored in a storage unit (not illustrated).

The control unit 114 predicts the amount of power that can be supplied to the grid 115 by the storage battery 132 of the vehicle 130 (step S102). The control unit 114 may, for example, predict the amount of power that the storage battery 132 is capable of supplying to the grid 115 each day. For example, the control unit 114 may perform this prediction on the basis of the past travel records of the vehicle 130, these being received from the facility 120 via the network 140. In cases where the control unit 114 is capable of acquiring the details of the automobile insurance contract to which the customer is subscribed, the control unit 114 may perform this prediction according to the distance to be traveled by the vehicle or the like as based upon these contract details.

As illustrated in FIG. 3, the control unit 114 predicts the amounts of electric power stored in the storage battery 132 (i.e. the remaining amounts) "for traveling" and "for grid use". Here, "for traveling" indicates the predicted value of the power amount, among the electrical power that can be stored in the storage battery 132, that is for consumption in order for the customer to drive the vehicle 130. On the other hand, "for grid use" indicates the predicted value of the power amount, among the electrical power that can be stored in the storage battery 132, that can be consumed for uses other than "for traveling". Since the customer does not use the "for grid use" power amount for driving the vehicle 130 and will not consume this power during the same day, therefore this is a power amount that, according to requirements, may be supplied to the grid 115 by discharging the storage battery 132.

As illustrated in FIG. 3, the maximum electricity storage capacity of the storage battery 132 is 24 kWh. As one example, FIG. 3 illustrates the results that are predicted from June 1 (Sunday) to June 4 (Wednesday). Furthermore, in the example illustrated in FIG. 3, change of the remaining amount of charge is shown every thirty minutes, with 0 h (midnight) each day being taken as a reference, in other words under the supposition that the battery is charged up to its maximum storage capacity at 0 h (midnight).

In the example illustrated in FIG. 3, on June 1 (Sunday), 24 kWh, which is the maximum electricity storage capacity of the storage battery 132, is allocated "for traveling", while no power is allocated "for grid use". For example, this is because, on the basis of the past traveling records of the vehicle 130, there is a possibility that no power will remain "for grid use" on Sunday, and accordingly it is illustrated that the control unit 114 allocates the entire amount of power charged into the storage battery 132 "for traveling". In FIG. 3, in the row for remaining capacity for June 1 (Sunday), 4.5 kWh is entered as the power "for traveling". This indicates that the control unit 114 has predicted that at the end of Sunday the capacity remaining in the storage battery 132 will be 4.5 kWh, for example.

Next, referring to the column for June 2 (Monday) in the table illustrated in FIG. 3, 5.0 kWh is allocated as power "for traveling" and 19.0 kWh is allocated as power "for grid use". This shows that the control unit 114 predicts that if, for example, on the basis of the past travel records of the vehicle 130, 5.0 kWh of power is allocated "for traveling" on Monday, then there will be sufficient for the customer to drive the vehicle 130. Due to this, the control unit 114 predicts that it will be possible to employ 19.0 kWh of power "for grid use". In the example illustrated in FIG. 3, the control unit 114 predicts that, of the 5.0 kWh allocated as power "for traveling", 1.8 kWh will remain at the end time point of 2 June (Monday). And for 3 June (Tuesday) and 4 June (Wednesday) as well, approximately the same prediction results are outputted as for 1 June (Monday).

In this manner, the control unit 114 is able to enhance the accuracy of prediction of the power supply/demand balance in the power management system 100 by predicting, for each day, the change in the stored electrical power "for traveling" and "for grid use" every thirty minutes.

For example, the control unit 126 of the facility 120 may periodically transmit information from the communication unit 125 to the control unit 114 relating to the power requirement of the facility 120 (step S103). This information relating to the power requirement of the facility 120 may, for example, be the amount of power predicted to be consumed at the facility 120 after a predetermined time period. This information relating to the power requirement of the facility 120 may, for example, be generated by the control unit 126 on the basis of the current power consumption amount at the facility 120.

On the basis of the information related to power demand received from the control unit 126, the control unit 114 updates the predicted value of power demand amount calculated in step S101 (step S104).

Then, the control unit 114 transmits the predicted value of the power demand amount that has thus been calculated to the control unit 126 of the facility 120 (step S105). The control unit 114 may, for example, transmit the predicted value of power demand periodically, or, for example, may transmit the predicted value of power demand each time information related to power demand has been acquired from the control unit 126.

In the power management system 100, when the customer connects the vehicle 130 to the facility 120, the connection I/F 124 transmits to the control unit 126 a connection notification indicating that the vehicle 130 has been connected to the facility 120 (step S106).

Upon receipt of this connection notification, the control unit 126 transmits a request for supply of information relating to the vehicle 130 to the control unit 133 via the connection I/F 12 (step S107).

In response to this information supply request from the control unit 126, the control unit 133 transmits vehicle information to the control unit 126 (step S108).

The control unit 126 transmits the vehicle information that has been acquired from the control unit 133 to the control unit 114 (step S109).

Upon acquisition of the vehicle information from the control unit 126, the control unit 114 updates the predicted value of the amount of power that can be supplied by the storage battery 132 of the vehicle 130 to the grid 115, which was calculated in step S102 (step S110). At this time, according to requirements, the control unit 114 may, for example, correct the information relating to the predicted result illustrated, for example, in FIG. 3 on the basis of the state of the storage battery 132 of the vehicle 130, which is included in the vehicle information.

The control unit 114 transmits to the control unit 126 the updated predicted value of the power amount that can be supplied to the grid 115 by the storage battery 132 (step S111).

The control unit 126 then transmits to the control unit 133, via the connection I/F 124, the predicted value of the power amount that can be supplied to the grid 115 by the storage battery 132, which has been acquired from the control unit 114 (step S112).

Figure 4:
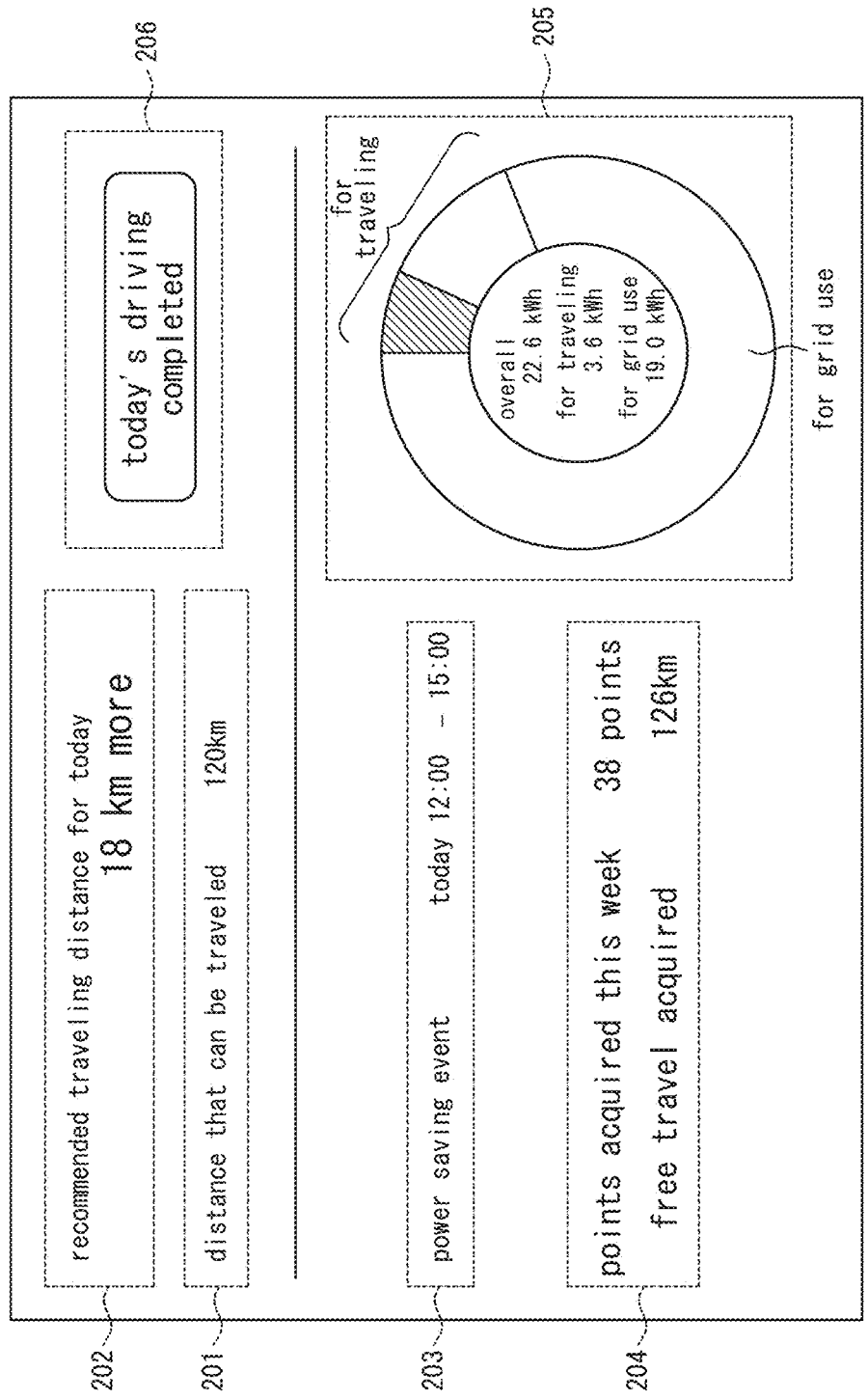
FIG. 4 is a figure illustrating an example of a screen that is displayed upon a display unit of the power management system of FIG. 1.

When, for example, the control unit 126 of the facility 120 has acquired the updated predicted value in step S111 of FIG. 2, the screen 200 illustrated in FIG. 4 is displayed upon the display unit 127. Alternatively, for example, the screen 200 illustrated in FIG. 4 may be displayed upon the display unit 135, when the control unit 133 of the vehicle 130 has acquired the updated predicted value in step S112 of FIG. 2. Here, the explanation assumes that the display unit 127 and the display unit 135 are also endowed with the function of acting as input units.

As illustrated in FIG. 4, the distance that can be traveled 201, a recommended traveling distance range 202, a power saving event 203, power saving event cooperation information 204, a remaining power amount information graph 205, and a driving completed button 206 are displayed upon the screen 200.

The distance that can be traveled 201 is information related to the maximum distance that can be traveled by the vehicle 130, and is calculated on the basis of the amount of electrical power stored in the storage battery 132 of the vehicle 130. In other words, the distance that can be traveled 201 specifies the distance that the vehicle 130 is capable of traveling using the current amount of electrical power stored in the storage battery 132, without the battery being further charged.

The recommended traveling distance range 202 is information related to the distance that can be traveled by the vehicle 130, and is calculated on the basis of the power, among the power in the storage battery 132 that has been allocated to "for traveling", that has not yet been consumed. In other words, the recommended traveling distance range 202 specifies the distance that the vehicle can travel using the remaining amount of power that was allocated as being "for traveling". The customer can drive the vehicle 130 for a distance that is greater than this distance displayed as the recommended traveling distance range 202, provided that some power that has been allocated as being "for grid use" remains in the storage battery 132. However, in such a case, there is a possibility that the customer may not be able to cooperate with the requirements of the power management system 100 for power saving, and that he may not be able to receive any reward such as will be described hereinafter.

The power saving event 203 is information related to a request for power saving that is notified by the control unit 114 to the customer. When, for example on the basis of the predicted value of the power demand amount and the predicted value of the power amount that can be supplied by the storage battery 132 to the grid 115 calculated by the control unit 114 and so on, it has been determined that a request for power saving is necessary, then the power saving event 203 is notified to the facility 120. As one example, the time slot during which power saving is requested may be displayed upon the screen 200 illustrated in FIG. 4 as the specific details of the power saving event 203.

The power saving event cooperation information 204 is information that specifies a cooperation situation by the customer for a power saving event. For example, the power saving event cooperation information 204 may be initialized every week on Sunday, and may be displayed as the cooperation situation for each week. As power saving event cooperation information 204, the reward that the customer can obtain by cooperation, and the benefit that the customer can enjoy corresponding to this reward, are displayed on the screen 200 illustrated in FIG. 4. In this embodiment, rewards are given to the customer as points. For example, according to the number of points acquired, the customer may be able to charge the storage battery 132 for free. As illustrated in FIG. 4, in this embodiment, the distance that the vehicle is capable of traveling using the stored power when the storage battery 132 has been charged by using the points that have been acquired is displayed as the benefit that the customer can enjoy in accordance with the reward.

The remaining power amount information graph 205 is a doughnut chart that displays information related to the remaining amount of electricity in the storage battery 132 (i.e. the stored electrical power). The entire remaining amount of power in the storage battery 132, the remaining amount "for traveling", and the remaining amount "for grid use" are shown as numerical values in the center of the doughnut chart. The capacities of the storage battery 132 that are allocated "for traveling" and "for grid use" are both displayed in the doughnut chart. The power of the storage battery 132 that has been consumed is also displayed in the doughnut chart. In the example illustrated in FIG. 4, it is indicated that some of the capacity that was allocated "for traveling" has been consumed.

By viewing the distance that can be traveled 201, the recommended traveling distance range 202, the power saving event 203, the power saving event cooperation information 204, and the remaining power amount information graph 205 that are displayed upon the screen 200, the customer is able to check information of various types related to the power management system 100. Such information of various types includes the amount of charge remaining in the storage battery 132, the presence or absence of a power saving request, and so on.

The driving completed button 206 is a button for the customer to convey his intention not to use the vehicle any further during this day. The customer is able to perform operation to select the driving completed button 206 in the state in which the vehicle 130 is connected to the facility 120. When the customer selects the driving completed button 206, it is determined by the power management system 100 that the entire amount of power remaining in the storage battery 132 at the time point of selection is all power that can be supplied to the grid 115.

Figure 5:
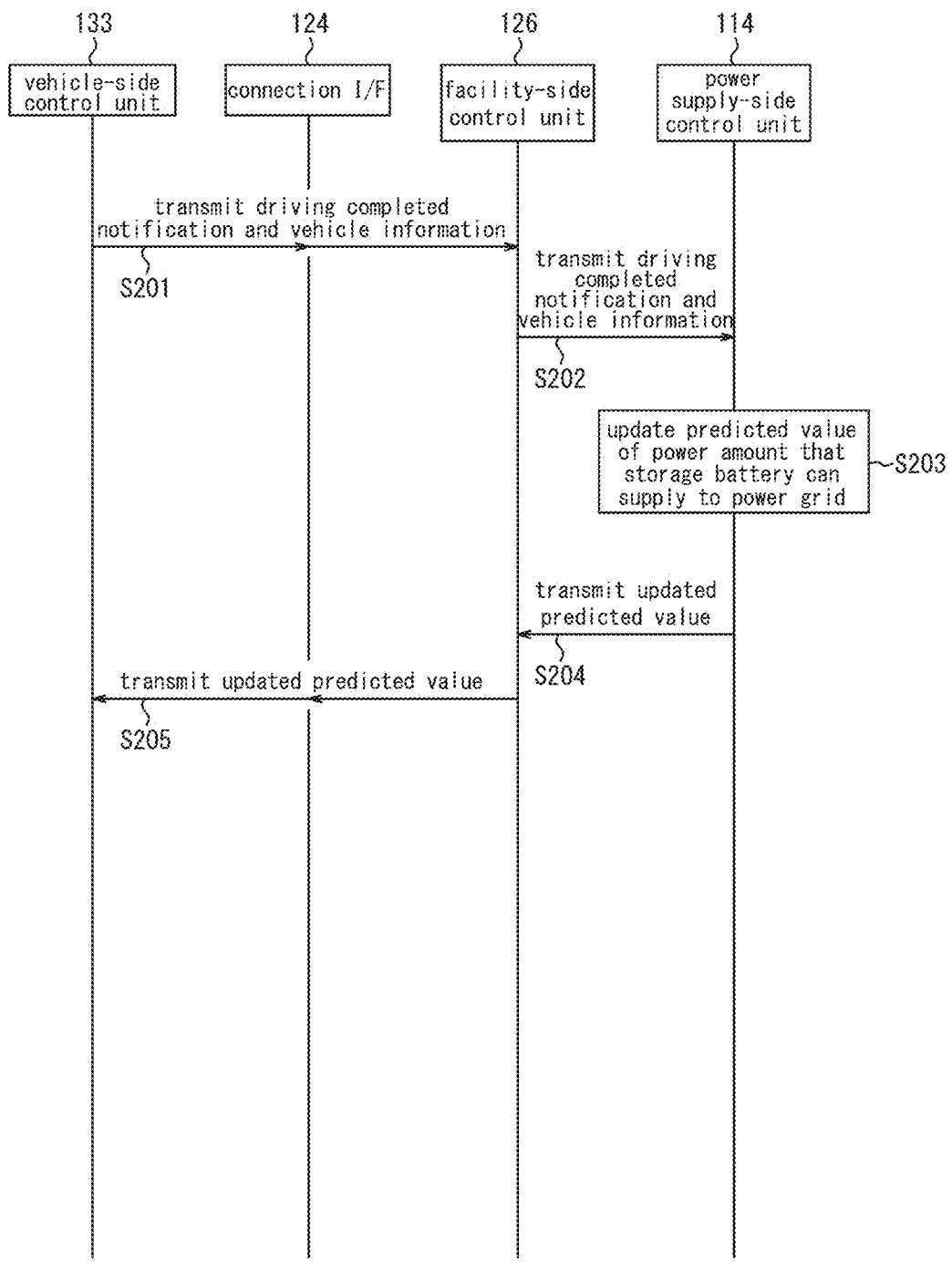
FIG. 5 is a sequence diagram illustrating an example of processing by the power management system when the customer has selected a driving completed button.

Now, as one example, a case in which the customer has selected the driving completed button displayed upon the display unit 135 of the vehicle 130 will be explained with reference to FIG. 5.

When the customer selects the driving completed button 206 which is displayed upon the display unit 135, the control unit 133 transmits a notification indicating that the driving completed button 206 has been selected to the control unit 126 of the facility 120, along with the vehicle information (step S201).

The control unit 126 transmits the driving completed notification and the vehicle information that have been acquired from the control unit 133 to the control unit 114 (step S202).

The control unit 114 updates the predicted value of the amount of power that the storage battery 132 of the vehicle 130 is capable of supplying to the grid 115 (step S203). At this time, upon acquisition of the driving completed notification, the control unit 114 determines that all of the remaining amount of charge in the storage battery 132 of the vehicle 130 can be supplied to the grid 115, and updates the predicted value so as to include all of the remaining amount of charge in the storage battery 132 in the amount of power that can be supplied to the grid 115.

Since the following steps S204 and S205 respectively correspond to steps S111 and S112 in FIG. 2, detailed explanation thereof will here be omitted.

According to requirements, for example, when the power amount requested by the facility 120 exceeds the power generated by the power supply network 110, the control unit 114 may perform control so as to cause power to be supplied to the grid 115 from the storage battery 132, which is electrically connected to the grid 115. When power is thus supplied from the storage battery 132 to the grid 115, the grid 115 is able to supply the power that is supplied from the storage battery 132 to the facility 120, which is electrically connected to the grid 115. By doing this, according to this power management system 100, when the customer is not using the vehicle 130, the storage battery 132 equipped to the vehicle 130 can be used as a power source. Therefore, according to this power management system 100, when the customer is using the vehicle, the power of the vehicle 130 is not consumed; whereas, on the other hand, when the customer is not using the vehicle 130, it is possible to stabilize the supply of power by enabling the power of the vehicle to be consumed.

Figure 6:
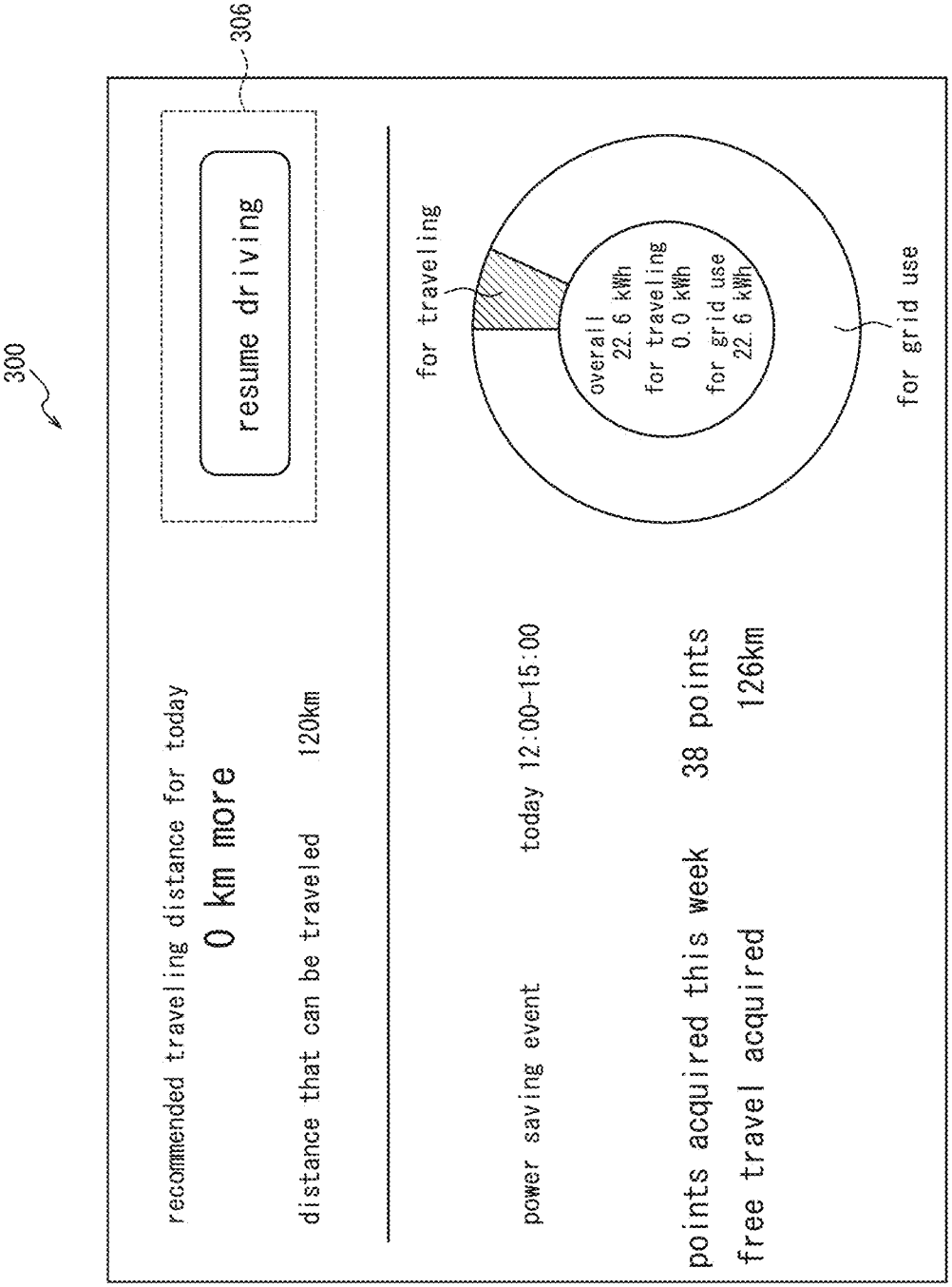
FIG. 6 is a figure illustrating an example of a screen that is displayed upon the display unit when the customer has selected the driving completed button.

As illustrated in FIG. 6, as compared with the screen 200 of FIG. 4, on the screen 300, the driving completed button 206 is changed to a driving resumption button 306. If, after the customer has once selected the driving completed button 206 on the screen 200 of FIG. 4, he wishes to make the vehicle 130 run again, then he selects the driving resumption button 306. When the customer selects the driving resumption button 306, the display on the display unit 135 changes over from the screen 300 to the screen 200, and part of the remaining charge amount in the storage battery 132 is allocated as being "for traveling".

Figure 7:
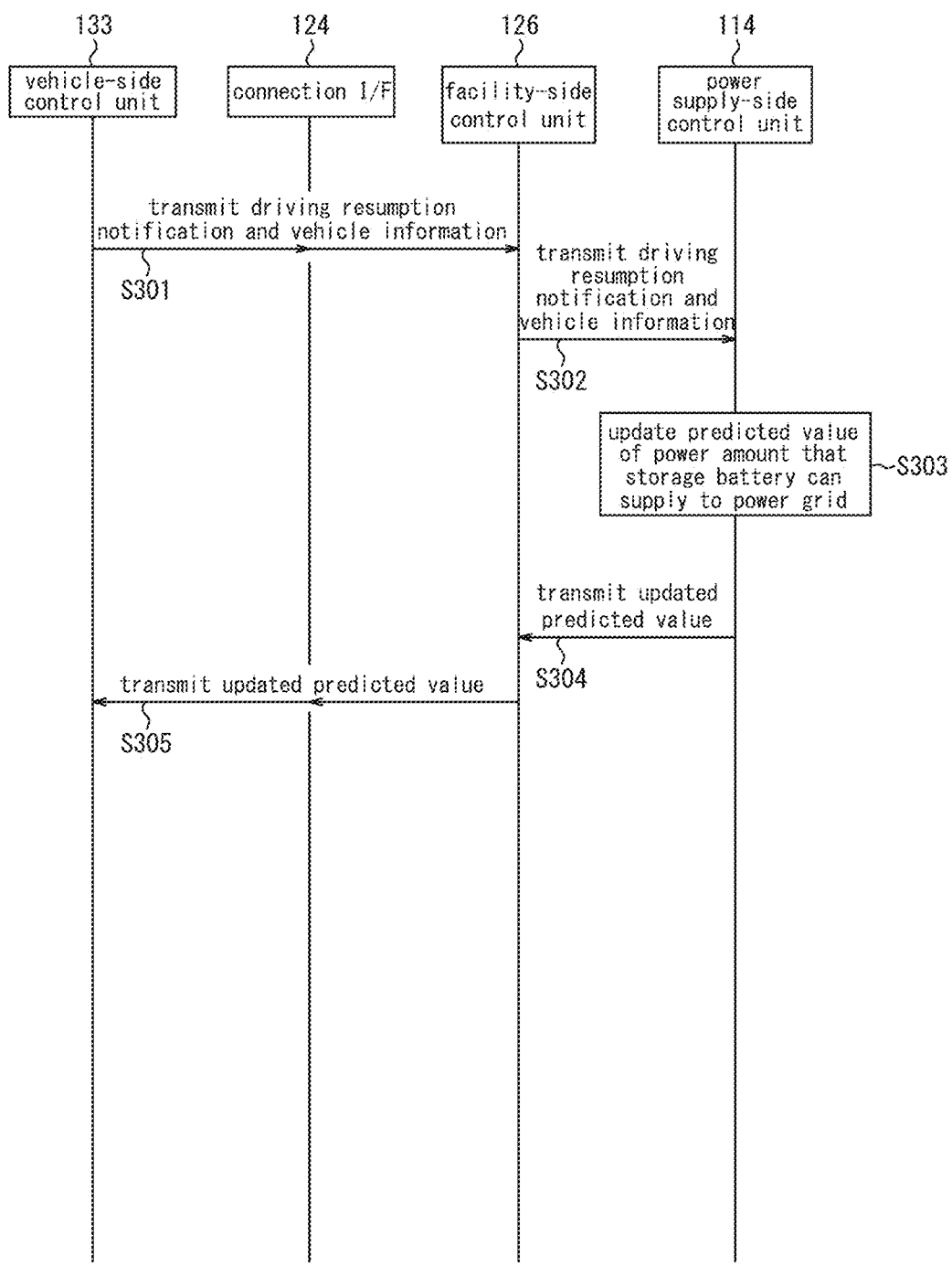
FIG. 7 is a sequence diagram illustrating an example of processing by the power management system when the customer has selected a driving resumption button.

Referring to FIG. 7, the case when the customer has selected the driving resumption button 306 displayed upon the display unit 135 will be explained, in a similar manner to the explanation of FIG. 5.

When the customer selects the driving resumption button 306 which is displayed upon the display unit 135, the control unit 133 transmits a driving resumption notification indicating that the driving resumption button 306 has been selected to the control unit 126 of the facility 120, together with the vehicle information (step S301).

The control unit 126 transmits the driving resumption notification and the vehicle information that have been acquired from the control unit 133 to the control unit 114 (step S302).

The control unit 114 updates the predicted value of the power amount that the storage battery 132 of the vehicle 130 can supply to the grid 115 (step S303). At this time, the control unit 114 determines that, due to the driving resumption notification, supply of power can no longer be performed from the storage battery 132 of the vehicle 130 to the grid 115, and excludes the amount of power remaining in the storage battery 132 of the vehicle 130 from the power that can be supplied to the grid 115 and updates the predicted value thereof.

Since the subsequent steps S304 and S305 respectively correspond to the steps S111 and S112 in FIG. 2, detailed explanation thereof will here be omitted.

In this manner, even after the customer has once selected the driving completed button 206, he is enabled to drive again if, for example, a necessity for driving arises. Therefore, according to this power management system 100, the convenience for the customer is enhanced.

In the above explanation, it has been described that the driving completed notification and the driving resumption notification are transmitted from the control unit 133 by the customer selecting the driving completed button 206 and the driving resumption button 306 respectively, but the driving completed notification and the driving resumption notification may also be transmitted on the basis of operations of some other type. For example, for the driving completed notification and the driving resumption notification may be transmitted on the basis of operation performed upon a charging plug that is used for the customer to connect together the facility 120 and the vehicle 130.

Figure 8:
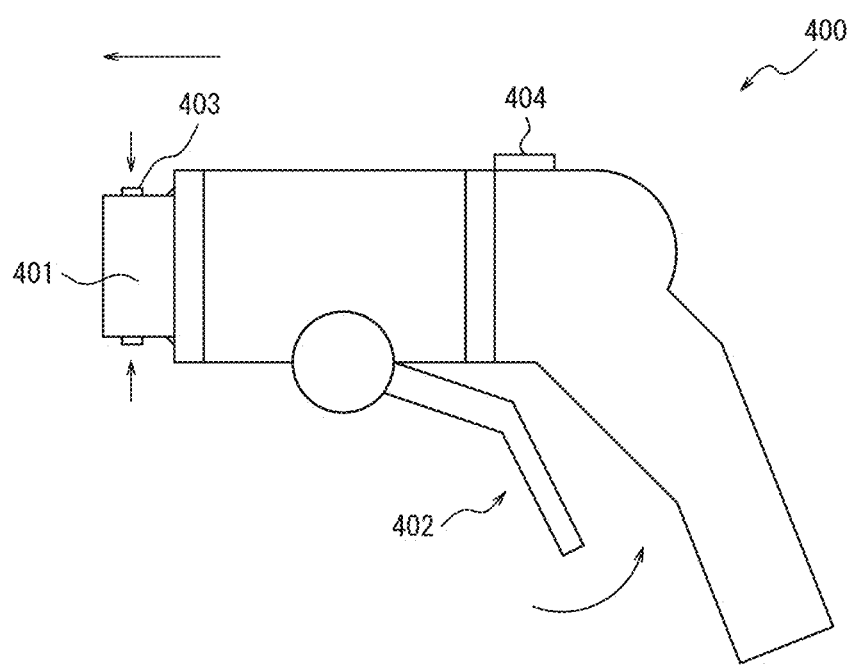
FIG. 8 is a figure schematically illustrating an example of a charging plug.

By, for example, operating the charging plug 400 illustrated in FIG. 8, the customer is able to cause a driving completed notification and a driving resumption notification to be transmitted simultaneously with performing connection and performing removal of the charging plug 400 to and from the vehicle 130, respectively.

The charging plug 400 comprises a connection unit 401, a lever 402, a removal prevention catch 403, and an operation switch 404. The customer connects the charging plug 400 to the vehicle 130 by connecting (i.e. inserting) the connection unit 401 to the connection I/F 131 (the power inlet) of the vehicle 130 while operating the lever 402. The removal prevention catch 403 prevents the connection unit 401 which has been inserted into the connection I/F 131 from being unintentionally pulled out.

Figure 9:
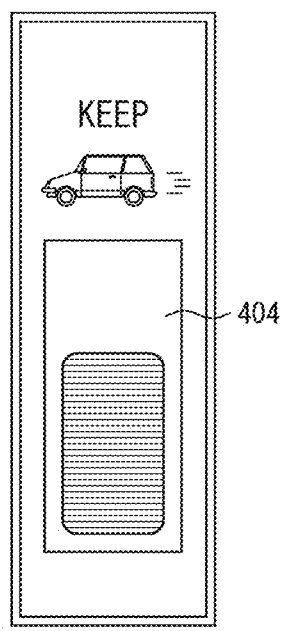
FIG. 9 is a figure for explanation of an example of operation of an operation switch of the charging plug of FIG. 8.
Figure 10:
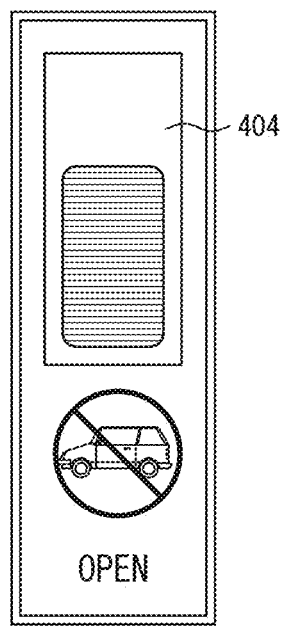
FIG. 10 is a figure for explanation of an example of operation of the operation switch of the charging plug of FIG. 8.

FIGS. 9 and 10 are figures illustrating the operation switch 404 of the charging plug 400 in plan view. The operation switch 404 may, for example, have a non slip upper surface so as to be easy to operate. By sliding the operation switch 404, the customer can manipulate it to a first position and to a second position.

When the customer intends to perform driving of the vehicle 130 on the same day, he may, for example, manipulate the operation switch 404 so that it goes to its first position as shown in FIG. 9. Accordingly, for example, when the customer has connected the charging plug 400 to the connection I/F 131, then no driving completed notification is transmitted if the operation switch 404 is kept at its first position.

When the customer does not intend to perform driving of the vehicle 130 on the same day, then he may, for example, manipulate the operation switch 404 so that it goes to its second position as shown in FIG. 10. Accordingly, for example, when the customer has connected the charging plug 400 to the connection I/F 131, then a driving completed notification is transmitted by shifting the operation switch 404 from its first position to its second position.

If the operation switch 404 is in its second position, then a driving resumption notification is transmitted when the customer shifts the operation switch 404 to its first position. Accordingly, if for example a requirement arises for driving the vehicle 130, then, when the customer removes the charging plug 400 from the connection I/F 131, it is possible for him to transmit a driving resumption notification by shifting the position of the operation switch 404 from its second position to its first position.

In this manner, according to this charging plug 400 explained with reference to FIGS. 8 through 10, the customer is able to operate the position of the operation switch 404 when removing and replacing the charging plug 400 from and to the connection I/F 131. Since a driving resumption notification and a driving completed notification are transmitted automatically by operating the position of the operation switch 404, therefore, according to this charging plug 400, convenience can be enhanced.

As described above, the control unit 114 acquires information related to the state of the storage battery 132, and decides whether it is possible to supply the stored electrical power of the storage battery 132 to the grid 115 on the basis of the information related to the state of the storage battery 132 and an operation input from the user of the vehicle 130 (i.e. the driving completed notification). When the required power exceeds the power generated by the power supply network 110, then, according to requirements, control is performed so that power is supplied to the grid 115 from the storage battery 132, which is electrically connected to the grid 115. In this manner, according to this power management system 100, if the customer is not going to use the vehicle 130, then it is possible to stabilize the supply of power by making it possible to consume the power of the vehicle 130.

The present disclosure is not to be considered as being limited only to the embodiment described above; various modifications and changes thereto are possible. For example, it would be possible to implement various rearrangements of the constituent parts, provided that their functions and so on do not logically contradict one another, and it would also be possible to combine a plurality of constituent elements into one, or to divide one or more of them.

For example, in the description of the above embodiment, it has been explained that the control unit 114 performs control so that, if required, power is supplied to the grid 115 from the storage battery 132 that is electrically connected to the grid 115. However, it would also be acceptable for the electrical power of the storage battery 132 to be supplied to the load 122 within the facility 120.

In the description of the above embodiment, it has been explained that the power management system 100 included the vehicle 130 which was equipped with the storage battery 132. However, the power management system 100 need not necessarily include the vehicle 130. Provided, for example, that the power management system 100 includes a movable device that is equipped with a storage battery 132, it is possible to implement a power management method that is similar to that of the embodiment described above.

The vehicle 130, or the movable device that serves instead, may be provided with an electricity generation device as well as with the storage battery 132, or instead of the storage battery 132. In this case, the control unit 114 will be able to supply power generated by the electricity generation device to the grid 115. As an example of a vehicle that is equipped with an electricity generation device, a fuel cell automobile or the like may be cited.

In the above embodiment, it was explained that the facility 120 is the residence of the customer, but the facility 120 need not necessarily be the residence of a customer. The facility 120 may, for example, be a workplace. In this case, the user of the vehicle 130 can, for example, connect the vehicle 130 to a charging cable possessed by the company after arriving at the workplace, thus making it possible to supply the electrical power stored in the storage battery 132 to the grid 115.

The invention claimed is:

1. A power management apparatus, the apparatus comprising:
   a control unit controlling supply of power from a grid to a load of a facility, the control unit configured to:
   acquire information related to a state of a storage battery mounted to a vehicle;
   calculate a first predicted value which is a predicted value of a power amount that can be supplied from the storage battery to the grid based on a travel record of the vehicle; and
   transmit the first predicted value to the vehicle.

2. The power management apparatus according to claim 1, wherein, in response to receiving a driving completed notification of the vehicle, the control unit updates the first predicted value to be a predicted value of a power amount stored in the storage battery.

3. The power management apparatus according to claim 1, wherein, in response to receiving a driving resumption notification of the vehicle, the control unit updates the first predicted value.

4. The power management apparatus according to claim 1, wherein the first predicted value is used by a display unit to display a recommended traveling distance range.

5. The power management apparatus according to claim 1, wherein the first predicted value is used by a display unit mounted to the vehicle to display the first predicted value and a second predicted value which is a predicted value of a power amount used for vehicle traveling.

6. A power management system, the power management system comprising:
   a storage battery that is mounted to a vehicle; and
   a controller configured to
   control supply of power from a grid to a load of a facility,
   acquire information related to a state of the storage battery,
   calculate a first predicted value which is a predicted value of a power amount that can be supplied from the storage battery to the grid based on a travel record of the vehicle, and
   transmit the first predicted value to the vehicle.

7. The power management system according to claim 6, wherein, in response to receiving a driving completed notification of the vehicle, the controller updates the first predicted value to be a predicted value of a power amount stored in the storage battery.

8. The power management system according to claim 6, wherein in response to receiving a driving resumption notification of the vehicle, the controller updates the first predicted value.

9. The power management system according to claim 6, wherein the first predicted value is used by a display unit to display a recommended traveling distance range.

10. The power management system according to claim 6, wherein the first predicted value is used by a display unit mounted to the vehicle to display the first predicted value and a second predicted value which is a predicted value of a power amount used for vehicle traveling.

11. A power management method performed by a power management apparatus that comprises a control unit that controls supply of power from a grid to a load of a facility, the method comprising:
   acquiring by the control unit information related to a state of a storage battery mounted to a vehicle;
   calculating a first predicted value which is a predicted value of a power amount that can be supplied from the storage battery to the grid; and
   transmitting the first predicted value to the vehicle.

12. The power management method according to claim 11, further comprising: in response to receiving a driving completed notification of the vehicle, updating the first predicted value to be a predicted value of a power amount stored in the storage battery.

13. The power management method according to claim 11, further comprising: in response to receiving a driving resumption notification of the vehicle, updating the first predicted value to be a predicted value of a power amount stored in the storage battery.

14. The power management method according to claim 11, wherein the first predicted value is used by a display unit to display a recommended traveling distance range.

15. The power management method according to claim 11, wherein the first predicted value is used by a display unit mounted to the vehicle to display the first predicted value and a second predicted value which is a predicted value of a power amount used for vehicle traveling.

* * * * *